United States Patent Office 3,629,244
Patented Dec. 21, 1971

3,629,244
17β-ETHERS OF Δ$^{4,9,11}$-GONATRIENES AND COMPOSITIONS CONTAINING THEM
Germain Costerousse, Montrouge, and Jean-Claude Gasc, Bondy, France, assignors to Roussel-UCLAF, Paris, France
No Drawing. Continuation-in-part of application Ser. No. 628,273, Apr. 4, 1967. This application Aug. 13, 1969, Ser. No. 850,346
Claims priority, application France, July 8, 1966, 68,751; Feb. 15, 1967, 95,053
Int. Cl. C07c 173/00
U.S. Cl. 260—239.55        16 Claims

ABSTRACT OF THE DISCLOSURE

This invention relates to 17β-ethers of Δ$^{4,9,11}$-gonatrienes of the formula

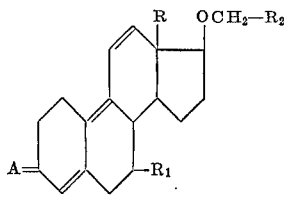

wherein

A represents a member selected from the group consisting of oxygen, di-lower-alkoxy and lower alkylene dioxy;
R represents alkyl having from 1 to 4 carbon atoms;
R$_1$ represents a member selected from the group consisting of hydrogen and lower alkyl; and
R$_2$ represents a member selected from the group consisting of substituted and unsubstituted phenyl, cyclohexyl, cyclohexenyl and cyclohexadienyl. These compounds have a particularly long-lasting and persistent anabolisant and androgenic activity, on subcutaneous administration.

PRIOR APPLICATIONS

This application is a continuation-in-part of the copending application Ser. No. 628,273, filed Apr. 4, 1967, now abandoned.

OBJECTS OF THE INVENTION

An object of the present invention is the obtention of 17β-ethers of Δ$^{4,9,11}$-gonatrienes of the formula

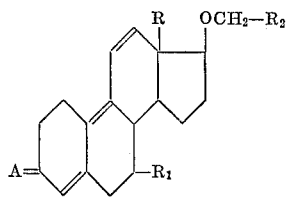

wherein

A represents a member selected from the group consisting of oxygen, di-lower-alkyloxy and lower alkylene dioxy;
R represents alkyl having from 1 to 4 carbon atoms;
R$_1$ represents a member selected from the group consisting of hydrogen and lower alkyl;
R$_2$ represents a member selected from the group consisting of substituted and unsubstituted phenyl, cyclohexyl, cyclohexenyl and cyclohexadienyl.

Another object of the invention is the development of a method for promoting proteidic anabolism over a long period which comprises administering to warm-blooded animals a single dose of from 15 to 100 mg./kg. of a compound of the above 17β-ethers of Δ$^{4,9,11}$-gonatrienes.

These and other objects of the invention will become more apparent as the description thereof proceeds.

DESCRIPTION OF THE INVENTION

The present invention relates to the 17β-ethers of Δ$^{4,9,11}$-gonatrienes of the general Formula I

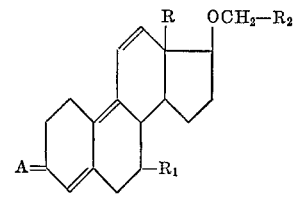

wherein

A represents an oxygen atom or a ketal radical,
R represents an alkyl radical having from 1 to 4 carbon atoms;
R$_2$ represents a cyclic hydrocarbon radical, substituted or unsubstituted, saturated or unsaturated;
R$_2$ represents a hydrogen atom or a lower alkyl radical.

The 17β-cyclic hydrocarbon-methoxy compounds of the general Formula I possess interesting physiological properties; in particular, they possess an anabolisant action. Moreover, they are endowed with a significant androgenic activity. Particularly, the compounds, when administered in an oily solvent, are active on the proteidic metabolism in a long lasting and persistent manner over a period of at least thirty days.

In a general manner, the great advantage of the 17β-cyclic ethers of the Δ$^{4,9,11}$gonatrienes of the general Formula I lies in the fact that they are active over long periods of time, administered by a single injection in an oily solvent.

The process for the preparation of the 17β-cyclic ethers of the Δ$^{4,9,11}$-gonatrienes of the general Formula I is accomplished according to classical methods. Advantageous results are obtained by utilizing etherification processes particularly adapted for the obtention of the categories of the desired structure. Of course, these particular etherification processes represent part of the present invention.

The processes for the preparation of the 17β-cyclic ethers of the Δ$^{4,9,11}$-gonatrienes of the general Formula I are characterized in that an etherification is effected in a known manner such as by the action of a halomethyl-cyclic hydrocarbon, wherein the cyclic hydrocarbon radical is substituted or unsubstituted, saturated or unsaturated, on a mono- or divalent metal derivative of a 3-ketal-Δ$^{4,9,11}$-gonatriene-17β-ol, and, if desired, the 3-ketal-17-ether formed is subjected to an acid hydrolysis to obtain the corresponding 3-keto compound.

The starting materials for the etherification reaction are Δ$^{4,9,11}$-gonatriene-17β-ols of the formula

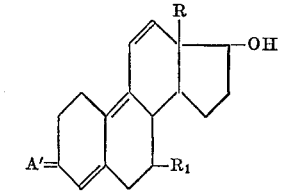

wherein A' is a ketal group and R and $R_1$ have the above-assigned values may be prepared by the method described in British patent specification No. 1,069,709 and other published literature indicated in the examples.

The substituent $R_2$ of general Formula I can be a cyclic hydrocarbon radical, substituted or unsubstituted, saturated or unsaturated. Preferably, the 17β-cyclic ethers of the $\Delta^{4,9,11}$-gonatrienes have the following Formula II

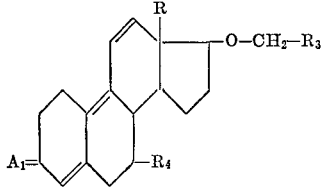

wherein $A_1$ is a member selected from the group consisting of oxygen and lower alkylene dioxy, such as ethylenedioxy.

R is an alkyl having from 1 to 4 carbon atoms, such as methyl, ethyl, propyl, etc.

$R_3$ is a member selected from the group consisting of phenyl, lower alkylsulfonylphenyl, lower alkylphenyl halophenyl, lower alkoxyphenyl, cyclohexy and cycohexenyl, such as p-methylsulfonylphenyl, 2',4',6'-trimethylphenyl, p-chlorophenyl, p-methoxyphenyl, cyclohex-1'-enyl, etc.; and $R_4$ is a member selected from the group consisting of hydrogen and methyl, such as 7α-methyl.

The 17β-cyclic ethers of the $\Delta^{4,9,11}$-gonatrienes of the above Formula I possess in particular an important anabolisant and androgenic action. When they are administered, preferably in an oily solvent such as olive oil containing benzyl alcohol, they have an extremely long-lasting effect. By tagging with a radio-active element, it has been ascertained that on injection, the compounds remain at the point of injection and persist at this point for more than thirty days. This allows a slow and even dissemination of the products into the blood stream and gives a controlled long time anabolisant and androgenic action.

The products may be utilized for the treatment of disturbances of proteidic anabolism, asthenia, thinness, osteoporosis, andropause, senescence, retardation of the consolidation of fractures, metabolic disturbances from prolonged corticotherapy, adiposo-genital syndrome, functional meno-metrorrhagia, fibroma endometriosis and as a cicatrization agent in the treatment of varicose ulcers.

The products of the invention may be administered by injection in warm-blooded animals transcutaneously. They are prepared in the form of injectable solutions or suspensions in the customary manner.

The useful dosology of the 17β-cyclic ethers of the $\Delta^{4,9,11}$-gonatrienes of the invention is controlled between 15 to 100 mg./kg. in the warm-blooded animal depending on the frequency of administration.

The following examples serve to characterize the invention. However, it is to be understood, that they do not limit the scope of the invention in any manner.

EXAMPLE 1

17β-benzyloxy-$\Delta^{4,9,11}$-estratriene-3-one (I, A=O, R=$CH_3$, $R_1$=H and $R_2$=phenyl)

(A) Preparation of 3-ethylenedioxy-17β-benzyloxy-$\Delta^{4,9,11}$-estratriene

R=$CH_3$, $R_1$=H and $R_2$=phenyl).

Over a period of one hour, at a temperature of 60° C., 3.144 gm. of 3-ethylenedioxy-$\Delta^{4,9,11}$-estratriene-17β-ol and 1.2 gm. of sodium hydride in vaseline oil were heated in 45 cc. of tetrahydrofuran. Then 4.75 cc. of benzyl bromide were added and the mixture was held at reflux for three hours. Thereafter, the reaction mixture was returned to the temperature of 20° C. and poured into a water-ice mixture. Next, the reaction mixture was extracted with methylene chloride. The methylene chloride phases were washed with water and dried over sodium sulfate. 2 cc. of triethylamine were added to the organic phase which was then evaporated to dryness. The residue obtained was taken up in 45 cc. of petroleum ether. The solution was evaporated to dryness, and 7.2 gm. of raw product were recovered, which was purified by chromatography and recrystallization from isopropanol. 2.144 gm. of 3-ethylenedioxy-17β-benzyloxy-$\Delta^{4,9,11}$-estratriene were obtained. The product occurred in the form of beige colored crystals, soluble in alcohol and chloroform, and insoluble in water. It had a melting point of 95° C.

Ultraviolet spectra (in ethanol):
Inflection toward 267 mμ $E_{1cm.}^{1\%}$=386
Inflection toward 280 mμ $E_{1cm.}^{1\%}$=702
Max. at 289–290 mμ $E_{1cm.}^{1\%}$=930 or ε=37,650
Inflection toward 300 mμ $E_{1cm.}^{1\%}$=760
Inflection toward 336 mμ $E_{1cm.}^{1\%}$=9.7

This compound is not described in the literature.

(B) Preparation of 3-ethylenedioxy-$\Delta^{4,9,11}$-estratriene-17β-ol, the starting compound.

3.7 gm. of 3-ethylenedioxy-$\Delta^{4,9,11}$-estratriene-17-one, described in the published Dutch patent application No. 6607609, were introduced into 55 cc. of anhydrous methanol. Next, in small fractions, 1.150 gm. of sodium borohydride were added. The mixture was agitated for 15 minutes and diluted with methylene chloride. The organic solution was washed twice with water, dried and concentrated to dryness under reduced pressure. The residue was crystallized from methanol containing 1% of pyridine. In this manner 2.8 gm. of 3-ethylenedioxy-$\Delta^{4,9,11}$-estradiene-17β-ol were obtained, having a melting point of 165° C.

Ultraviolet spectra (in ethanol):
Inflection toward 268 mμ (ε=16,300)
Inflection toward 280 mμ (ε=29,300)
Max. at 289–290 mμ (ε=38,600)
Inflection toward 299 mμ (ε=31,800)
Inflection toward 340 mμ (ε=104)

This product is not described in the litherature.

(C) Preparation of 17β-benzyloxy-$\Delta^{4,9,11}$-estratriene-3-one.

2.08 gm. of 3-ethylenedioxy-17β-benzyloxy-$\Delta^{4,9,11}$-estratriene were dissolved in 50 cc. of methanol, 1 cc. of water and 1 cc. of acetic acid. The solution was poured into a water-ice mixture and was extracted with methylene chloride. The organic phases were washed first with a saturated aqueous solution of sodium bicarbonate, then with water, dried over sodium sulfate and evaporated to dryness. 1.865 gm. of a raw 17β-benzyloxylated derivative were recovered, which was then purified by recrystallization by heating and cooling from isopropanol, thus obtaining 1.525 gm. of 17β-benzyloxy-$\Delta^{4,9,11}$-estratriene-3-one.

The product occurred in the form of pale yellow crystals, soluble in chloroform, and insoluble in water. The melting point was 134° C. with a specific rotation $$[\alpha]_D^{20}=+38.6°$$

(c=0.5% in methanol).

Analysis.—$C_{25}H_{28}O_2$ (percent): molecular weight =360.47. Calculated (percent): C, 83.29; H, 7.83. Found (percent): C, 83.0; H, 7.8.

Ultraviolet spectra (in ethanol):

Max. at 238 mµ     $E_{1cm}^{1\%} = 175$

Inflection toward 256 mµ  $E_{1cm}^{1\%} = 100$

Inflection toward 260 mµ  $E_{1cm}^{1\%} = 100$

Inflection toward 284 mµ  $E_{1cm}^{1\%} = 125$

Max. at 342–343 mµ  $E_{1cm}^{1\%} = 805$ or $\epsilon = 29{,}000$

This compound is not described in the literature.

(D) Pharacological study.—Determination of the anabolisant and androgenic activities:

The tests were effected according to the technique employed by Hershberger (Proc. Soc. Exp. Biol. Med. 1953, 83, 175), slightly modified. The test was conducted on male castrated rats, three and a half weeks old. The rats were treated, beginning the day following the castration, over a period of ten days, every day with the exception of the sixth day. Then they were sacrificed on the eleventh day, 22 to 26 hours after the last administration.

The animals were subjected to autopsy and the organs of interest were removed and weighed, in particular the levator ani for the study of the anabolisant action, the prostate gland and the seminal vesicles for the study of the androgenic effect.

17β-benzyloxy-Δ$^{4,9,11}$-estratriene-3-one, utilized in an oily solution, was administered orally at daily doses of $$4\gamma \times \frac{10}{9},\ 20\gamma \times \frac{10}{9}\ \text{and}\ 100\gamma \times \frac{10}{9}$$

(total doses of 40γ, 200γ and 1 mg. given in nine administrations over a period of ten days). The test was effected in comparison with the 17α-methyl-Δ$^{4,9,11}$-estratriene-17β-ol-3-one administered under the same experimental conditions and at the same doses.

The results are summarized in Table I.

From these results, it can be noted that 17β-benzyloxy-Δ$^{4,9,11}$-estratriene-3-one possesses, given orally, an anabolisant and androgenic activity appreciably equal to that of 17α-methyl-Δ$^{4,9,11}$-estratriene-17β-ol-3-one. Administered subcutaneously, the product studied is also as anabolisant as the comparison product, while being slightly less androgenic.

EXAMPLE 2

17β-(p-methylsulfonyl)-benxyloxy-Δ$^{4,9,11}$-estratriene-3-one (I, A=O, R=CH$_3$, R$_1$=H and R$_2$=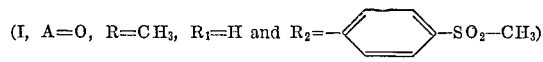)

(A) Preparation of 3-ethylenedioxy-17β-(p-methylsulfonyl)-benzyloxy-Δ$^{4,9,11}$-estratriene.

(I, A=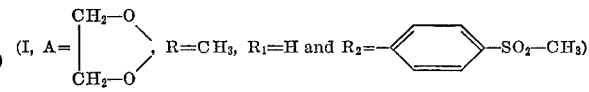, R=CH$_3$, R$_1$=H and R$_2$=—⟨phenyl⟩—SO$_2$—CH$_3$)

3.26 gm. of 3-ethylenedioxy-Δ$^{4,9,11}$-estratriene-17β-ol were dissolved in 37 cc. of tetrahydrofuran and 0.95 gm. of sodium hydride in vaseline oil were added thereto.

The mixture was heated to 45° C. for a period of forty-five minutes. Thereafter, under agitation and an atmosphere of nitrogen, 6.21 gm. of (p-methylsulfonyl)-benzyl bromide were added thereto. The mixture was agitated for a period of twenty-three hours, refrigerated and the excess sodium hydride was destroyed by ice water. The mixture was extracted with methylene chloride. The organic phases were washed with water until neutral and evaporated to dryness under vacuum. The residue was subjected to chromatography on silica and eluted with a mixture of benzene and ethyl acetate (7:3).

TABLE I

| Lots | Daily dose | Fresh levator ani, mg. | Seminal vesicles, mg. | Prostate gland mg. |
|---|---|---|---|---|
| Control | 0 | 15 1 | 5 4 | 7 3 |
| 17β-benzyloxy-β$^{4,9,11}$-estratriene-3-one | 4γ×10/9 | 18 7 | 8 5 | 16 0 |
|  | 20γ×10/9 | 32 6 | 10 4 | 22.0 |
|  | 100γ ·10/9 | 49 2 | 46.9 | 67.8 |
| 17α-methyl-Δ$^{4,9,11}$-estratriene-17β-ol-3-one | 4γ×10/9 | 21 0 | 9 8 | 23.7 |
|  | 20γ 10/9 | 31.4 | 29.8 | 44.0 |
|  | 100γ×10/9 | 40.6 | 81.9 | 77.9 |

In a second test, the studied product was administered subcutaneously at daily doses of $$10\gamma \times \frac{10}{9}\ \text{and}\ 100\gamma \times \frac{10}{9}$$

in a solution of olive oil admixed with 5% of benzyl alcohol. This product was compared with the 17β-acetoxy-Δ$^{4,9,11}$-estratriene-3-one administered under the same experimental conditions and at the same doses.

In Table II the results obtained are summarized.

1.94 gm. of 3-ethylenedioxy-17β-(p-methylsulfonyl)-benzyloxy-Δ$^{4,9,11}$-estratriene (yield-40%) were obtained which were utilized as such in the next step.

This compound is not described in the literature.

(B) Preparation of 17β-(p-methylsulfonyl)-benzyloxy-Δ$^{4,9,11}$-estratriene-3-one.

1.94 gm. of 3-ethylenedioxy-17β-(p-methylsulfonyl)-benzyloxy-Δ$^{4,9,11}$-estratriene were dissolved in 67 cc. of methanol and 9.4 cc. of water and 1 gm. of citric acid was added thereto. The reaction mixture was agitated for

TABLE II

| Lots | Daily dose | Fresh levator ani, mg. | Seminal vesicles, mg. | Prostate gland, mg. |
|---|---|---|---|---|
| Control | 0 | 15.1 | 5.4 | 7.3 |
| 17β-benzyloxy-Δ$^{4,9,11}$-estratriene-3-one | 10γ×10/9 | 25.9 | 7.5 | 16.1 |
|  | 100γ×10/9 | 60.6 | 68.0 | 71.7 |
| 17β-acetoxy-Δ$^{4,9,11}$-estratriene-3-one | 10γ 10/9 | 38.1 | 23.0 | 30.3 |
|  | 100γ×10/9 | 52.4 | 99.9 | 91.3 | forty minutes under an atomsphere of nitrogen and then poured into water. The aqueous mixture was extracted with methylene chloride. The organic phases were washed with water until neutral, dried over sodium sulfate and evaporated to dryness under vacuum. The residue was subjected to chromatography on silica and eluted with a mixture of benzene and ethyl acetate (7:3). 720 mgm. of raw product were recovered which was purified by recrystallization from methylene chloride and isopropyl ether. 690 mgm. of 17β-(p-methylsulfonyl)-benzyloxy-Δ$^{4,9,11}$-estratriene-3-one (yield-39%) were obtained.

The compound occurred in the form of colorless needles and was soluble in ethanol and chloroform and insoluble in water. It had a melting point of 180.5° C. and a specific rotation $[α]_D^{20}=+48°±2°$ (c.=0.5% in ethanol).

Analysis.—$C_{26}H_{30}O_4S$ (percent): molecular weight =438.59. Calculated: C, 71.20; H, 6.89; S, 7.31. Found (percent): C. 71.3; H, 6.9; S, 7.3.

Ultraviolet spectra (in ethanol):

Max. at 226 m$μ$ $E_{1\,cm.}^{1\%}$=365

Max. at 267 m$μ$ $E_{1\,cm.}^{1\%}$=101

Max. at 273 m$μ$ $E_{1\,cm.}^{1\%}$=102

Max. at 341 m$μ$ $E_{1\,cm.}^{1\%}$=676 or ε=29,600

This compond is not described in the literature.

EXAMPLE 3

17β-(2',4',6'-trimethyl)-benzyloxy-Δ$^{4,9,11}$-estratriene-3-one

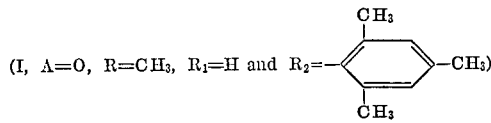

(A) Preparation of 3-ethylenedioxy-17β-(2',4',6'-trimethyl)-benzyloxy-Δ$^{4,9,11}$-estratriene

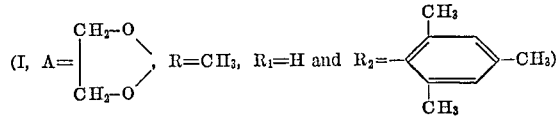

A mixture of 1.3 gm. of sodium hydride in vaseline oil, 26 cc. of tetrahydrofuran and 6.5 cc. of dimethylsulfoxide was agitated for a period of fifteen minutes at room temperature. A solution of 1 gm. of 3-ethylenedioxy-Δ$^{4,9,11}$-estratriene-17β-ol in 30 cc. of tetrahydrofuran was added thereto and the mixture was agitated for a period of thirty minutes. Thereafter, 2.65 gm. of 2,4,6-trimethyl-benzyl chloride were added. The reaction mixture was agitated for a period of fifteen hours at room temperature under an atmosphere of nitrogen. The excess of sodium hydride was then destroyed by the addition of ice. Water was added and the mixture was extracted with ethyl ether. The organic phases were washed with an aqueous solution of sodium chloride, dried over magnesium sulfate, filtered and concentrated. The residue was subjected to chromatography over silica gel and eluted with a mixture of cyclohexane and ethyl acetate (9:1) containing 0.2% of triethylamine.

893 mgm. of raw compound were recovered, which was dissolved in 9 cc. of methanol and 9 cc. of benzene and filtered. The benzene was evaporated from the solution while replacing it with methanol. Thereafter, the solution was concentrated until the start of crystallization and iced. 569 mgm. of 3-ethylenedioxy-17β-(2',4',6'-trimethyl)-benzyloxy-Δ$^{4,9,11}$-estratriene (yield—40%) were obtained.

The compound occurred in the form of a solid, colorless product, soluble in benzene and ethyl ether, slightly soluble in methanol, and insoluble in water, melting as 146° C.

Analysis.—$C_{30}H_{38}O_3$ (percent): molecular weight =446.60. Calculated: C, 80.68; H, 8.58. Found (percent): C, 81.2; H, 8.7.

This compound is not described in the literature.

(B) Preparation of 17β-(2',4',6'-trimethyl)-benzyloxy-Δ$^{4,9,11}$-estratriene-3-one.

550 mgm. of 3-ethylenedioxy-17β-(2',4',6'-trimethyl)-benzyloxy-Δ$^{4,9,11}$-estratriene were placed in suspension in 17 cc. of methanol and 2.9 volumes of water. The suspension was agitated for a period of fifty minutes at room temperature and 290 mgm. of citric acid, then 11.6 cc. of acetone were added. The reaction mixture was agitated for a period of thirty minutes. 15 cc. of water were added and the mixture was filtered. Crystallization was induced by scratching. The crystals were vacuum filtered and dried under vacuum.

404 mgm. of 17β-(2',4',6'-trimethyl)-benzyloxy-Δ$^{4,9,11}$-estratriene-3-one were obtained in the form of a pale yellow, solid product. The product is soluble in ethanol, chloroform, ethyl ether and benzene, slightly soluble in methanol, and insoluble in water. It melts at 117° C. and its specific rotation $[α]_D^{20}=+74°±2°$ (c=0.5% in ethanol).

Analysis. — $C_{28}H_{34}O_2$ (percent): molecular weight =402.55. Calculated: C, 83.54; H, 8.51. Found (percent): C, 83.3; H, 8.5.

I.R. Spectra (chloroform) shows:
  Presence of the trienone
  Presence of C—O—C
  Presence of an aromatic ring at 1,614 cm.$^{-1}$ U.V. Spectra (ethanol):

Max. at 219–220 m$μ$    $E_{1\,cm.}^{1\%}$=329

Inflection towards 239 m$μ$ $E_{1\,cm.}^{1\%}$=168

Inflection towards 270 m$μ$ $E_{1\,cm.}^{1\%}$=99

Max. at 340 m$μ$    $E_{1\,cm.}^{1\%}$=728 or ε=29,300

This compound is not described in the literature.

EXAMPLE 4

7α-methyl-17β-benzyloxy-Δ$^{4,9,11}$-estratriene-3-one

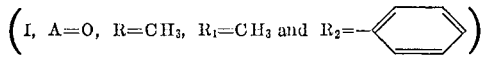

(A) Preparation of 3,3-dimethoxy-7α-methyl-17β-benzyloxy-Δ$^{5(10),9(11)}$-estradiene.

5 gm. of 3,3-dimethoxy-7α-methyl-Δ$^{5(10),9(11)}$-estradiene-17β-ol were dissolved in 75 cc. of tetrahydrofuran under an atmosphere of nitrogen. The interior temperature was brought to +10° C. and 1.90 gm. of sodium hydride in vaseline oil was added thereto. The mixture was agitated and heated for a period of thirty minutes at an interior temperature of 52°–54° C. Thereafter, 5.40 gm. of benzyl bromide were added and the mixture was agitated under an atmosphere of nitrogen for a period of seventeen hours at an interior temperature of 65° C. The mixture was poured into a mixture of water and ice, and extracted with methylene chloride. The organic phases were washed with water until neutral, dried over sodium sulfate and distilled to dryness under vacuum. The residue was subjected to chromatography on magnesium silicate and eluted with cyclohexane, then with methylene chloride.

2.17 gm. of 3,3-dimethoxy-7α-methyl-17β-benzyloxy-Δ$^{5(10),9(11)}$-estradiene were obtained in the form of a solid, colorless product melting at 45°–50° C.

I.R. Spectra (chloroform) showed:
Presence of aromatic ring
Presence of C—O—C
Absence of —OH This compound is not described in the literature.

The starting compound, 3,3 - dimethoxy - 7α - methyl-Δ$^{5(10),9(11)}$-estradiene-17β-ol is described in the copending application Ser. No. 602,112, filed Nov. 29, 1966, now abandoned.

(B) Preparation of 7α - methyl - 17β - benzyloxy-Δ$^{5(10),9(11)}$-estradiene-3-one.

0.15 gm. of 3,3-dimethoxy-7α-methyl-17β-benzyloxy-Δ$^{5(10),9(11)}$-estradiene were dissolved in 2 cc. of 95% acetic acid under agitation at room temperature. 0.3 cc. of water were added and the mixture was agitated for a period of one hour under an atmosphere of nitrogen. A further 2 cc. of water were added and the mixture was extracted with ether. The ethereal phases were washed with water, with an aqueous sodium bicarbonate solution, and again with water, and distilled to dryness under vacuum.

0.12 gm. of 7α-methyl-17β-benzyloxy-Δ$^{5(10),9(11)}$-estradiene-3-one were obtained, which was used as such in the next step.

This compound is not described in the literature.

(C) Preparation of 7α-methyl-11β-hydroperoxy-17β-benzyloxy-Δ$^{4,9}$-estradiene-3-one.

1.51 gm. of 7α-methyl-17β-benzyloxy-Δ$^{5(10),9(11)}$-estradiene-3-one were dissolved in 100 cc. of ethanol containing 0.2 cc. of triethylamine at room temperature. A stream of oxygen was passed therethrough for a period of nineteen hours. The solvent was evaporated to dryness under vacuum at a low temperature. 1.60 gm. of 7α-methyl - 11β - hydroperoxy - 17β - benzyloxy - Δ$^{4,9}$ - estradiene-3-one were obtained, which was used as such in the next step.

This compound is not described in the literature.

(D) Preparation of 7α - methyl - 17β - benzyloxy-Δ$^{4,9}$-estradiene-11β-ol-3-one.

1.60 gm. of 7α-methyl-11β-hydroperoxy-17β-benzyloxy-Δ$^{4,9}$-estradiene-3-one were dissolved in 50 cc. of methanol at room temperature. 2.5 cc. of trimethyl phosphite were added. The mixture was agitated for a period of thirty minutes and poured into 500 cc. of water containing 3 cc. of a 30% hydrogen peroxide solution. Sodium chloride was added and the mixture was extracted with methylene chloride. The organic phases were washed with an aqueous solution of sodium chloride, dried and evaporated to dryness under vacuum. The residue was subjected to chromatography over silica and eluted with a mixture of benzene and ethyl acetate (4:6).

0.86 gm. of 7α-methyl-17β-benzyloxy-Δ$^{4,9}$-estradiene-11β-ol-3-one were obtained which was utilized as such in the next step.

I. R. Spectra (chloroform) showed:
Presence of OH at 3,590 cm.$^{-1}$
Presence of dienone.
Presence of aromatic ring at 1,496 cm.$^{-1}$
Presence of C—O—C U.V. Spectra (ethanol):
Max. at 233 mμ E$^{1\%}_{1 cm.}$=126
Max. at 299 mμ E$^{1\%}_{1 cm.}$=466 or ε=18,300

This compound is not described in the literature.

(E) Preparation of 7α-methyl-17β-benzyloxy-Δ$^{4,9,11}$-estratriene-3-one.

0.86 gm. of 7α-methyl-17β-benzyloxy-Δ$^{4,9}$-estradiene-11β-ol-3-one were dissolved in 50 cc. of methylene chloride and 3 cc. of acetonitrile were added thereto under agitation at room temperature. Thereafter, 0.6 cc. of a 56° Bé. perchloric acid solution were added while agitating for a period of two minutes thirty seconds and then the solution was poured into water. The mixture was agitated, the organic phase was separated and washed with water until neutral, and distilled to dryness. The residue was recrystallized from isopropyl ether. 0.80 gm. of raw product were recovered, which was subject to purification by chromatography on silica and elution with a mixture of benzene and ethyl acetate (7:3).

0.65 gm. of 7α-methyl-17β-benzyloxy-Δ$^{4,9,11}$-estratriene-3-one were obtained in the form of a beige solid product, soluble in alcohols, ethyl ether and chlorinated solvents and insoluble in water. It melted at 120° C. and had a specific rotation $[\alpha]_D^{20}$=—20°±4° (c=0.25% in ethanol).

*Analysis.*—$C_{26}H_{30}O_2$ (percent): molecular weight =374.50. Calculated: C, 83.38; H, 8.07. Found (percent): C, 83.2; H, 8.2.

U.V. Spectra (ethanol:)
Max. at 238–239 mμ   E$^{1\%}_{1 cm.}$=172
Inflection towards 256 mμ E$^{1\%}_{1 cm.}$=108
Max. at 269–270 mμ   E$^{1\%}_{1 cm.}$=106
Inflection towards 282 mμ E$^{1\%}_{1 cm.}$=116
Max. at 343–344 mμ   E$^{1\%}_{1 cm.}$=734 or ε=27,500

This compound is not described in the literature.

EXAMPLE 5

13β-ethyl-17β-benzyloxy-Δ$^{4,9,11}$-gonatriene-3-one

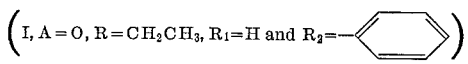

(A) Preparation of 3-ethylenedioxy-13β-ethyl-17β-benzyloxy-Δ$^{4,9,11}$-gonatriene

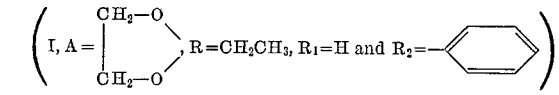

1.5 gm. of 3-ethylenedioxy-13β-ethyl-Δ$^{4,9,11}$-gonatriene-17β-ol were dissolved in 45 cc. of tetrahydrofuran and 420 mgm. of sodium hydride in vaseline oil were added. The reaction mixture was heated to 60° C. for a period of one hour and cooled. 3 cc. of benzyl bromide were added and the mixture was agitated for a period of sixteen hours at 60° C. The reaction mixture was brought to room temperature and 10 cc. of water were added. Thereafter the mixture was poured into water and extracted with ethyl ether. The ethereal phases were washed with water, then with an aqueous solution of sodium chloride, dried over magnesium sulfate and distilled to dryness under vacuum.

4.6 gm. of raw 3-ethylenedioxy-13β-ethyl-17β-benzyloxy-Δ$^{4,9,11}$-gonatriene were obtained which was utilized as such in the next step.

This compound is not described in the literature.

The starting compound 3-ethylenedioxy-13β-ethyl-Δ$^{4,9,11}$-gonatriene-17β-ol is described in British patent specification No. 1,069,709.

(B) Preparation of 13β-ethyl-17β-benzyloxy-Δ$^{4,9,11}$-gonatriene-3-one.

4.6 gm. of 3-ethylenedioxy-13β-ethyl-17β-benzyloxy-Δ$^{4,9,11}$-gonatriene were dissolved in 100 cc. of methanol containing 10% water. 820 mgm. of citric acid were added and the reaction mixture was agitated for a period of one hour in an inert atmosphere at room temperature. The reaction mixture was then poured into water and extracted with ethyl ether. The organic phases were washed with water, dried over magnesium sulfate and distilled to dryness under vacuum. The residue was subjected to chromatography over silica with elution with a mixture of benzene and ethyl acetate (8:2) and recrystallized from methanol.

100 mgm. of 13β-ethyl-17β-benzyloxy-$\Delta^{4,9,11}$-gonatriene-3-one were obtained in the form of pale yellow crystals, soluble in ethanol and methylene chloride and insoluble in water, melting at 141° C. Its specific rotation $[\alpha]_D^{20}=+35°\pm2°$ (c.=0.5% in chloroform).

*Analysis.*—$C_{26}H_{30}O_2$ (percent): molecular weight =374.50. Calculated: C, 83.38; H, 8.07. Found (percent): C, 82.2; H, 7.7.

U.V. Spectra (ethanol):

Max. at 237–238 mμ    $E_{1\,cm.}^{1\%}=167$

Max. at 269 mμ    $E_{1\,cm.}^{1\%}=97$

Max. at 342 mμ    $E_{1\,cm.}^{1\%}=792$ or $\epsilon=29,700$

This compound is not described in the literature.

(C) Determination of the anabolisant and androgenic activities of 13β-ethyl-17β-benzyloxy-$\Delta^{4,9,11}$-gonatriene-3-one.

The tests were effected according to the technique described in Example I(D) above.

The tests were made both by oral administration as well as by subcutaneous administration.

(1) Oral administration

13β-ethyl-17β-benzyloxy-$\Delta^{4,9,11}$-gonatriene-3-one, utilized in a solution in olive oil, was administered orally at daily doses of $$10\gamma \times \frac{10}{9} \text{ and } 30\gamma \times \frac{10}{9}$$

(total doses of 100γ and 300γ given in nine administrations over a period of ten days).

The results are summarized in Table III.

From these results, it can be noted that 13β-ethyl-17β-benzyloxy-$\Delta^{4,9,11}$-gonatriene-3-one possesses, when administered both orally and subcutaneously, an anabolisant and androgenic activity.

EXAMPLE 6

*17β-cyclohexylmethoxy-$\Delta^{4,9,11}$-estratriene-3-one*

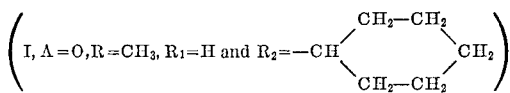

(A) Preparation of 3 - ethylenedioxy - 17β-cyclohexylmethoxy-$\Delta^{4,9,11}$-estratriene.

3.9 gm. of sodium hydride were suspended in 70 cc. of tetrahydrofuran and 18 cc. of dimethylsulfoxide at room temperature under an atmosphere of nitrogen. The mixture was agitated for 30 minutes, then 2.41 gm. of 3-ethylenedioxy-$\Delta^{4,9,11}$-estratriene-17β-ol were added, and the agitation was continued for 30 minutes. 7 cc. of cyclohexylmethyl bromide were added, and the mixture was agitated for 21 hours. Then 3.5 cc. of cyclohexylmethyl bromide were added and agitation was continued for 24 hours. Then a small quantity of water was added while agitating and maintaining the reaction mixture under an atmosphere of nitrogen and at a temperature below 20° C. The mixture was poured into water and extracted with ethyl ether. The ethereal extracts were washed with a 0.1 N sodium hydroxide solution, then with water, dried and evaporated to dryness. The residue was chromatographed over alumina, thus yielding 1.54 gm. of 3 - ethylenedioxy - 17β-cyclohexylmethoxy-$\Delta^{4,9,11}$-estratriene which was used as such for the next step of the synthesis. The product is soluble in ethanol, chloroform, benzene and ethyl ether, and insoluble in water.

As far as is known, this compound is not described in the literature.

(B) 17β-cyclohexylmethoxy-$\Delta^{4,9,11}$-estratriene-3-one.

1.54 gm. of the compound obtained in the preceding

TABLE III

| Lots | Daily dose | Fresh levator ani, mg. | Seminal vesicles, mg. | Prostate gland, mg. |
| --- | --- | --- | --- | --- |
| Control | 0 | 18.5 | 5.3 | 10.9 |
| 13β-ethyl-17β-benzyloxy-$\Delta^{4,9,11}$-gonatriene-3-one | $10\gamma \times \frac{10}{9}$ | 24.0 | 7.8 | 13.7 |
|  | $30\gamma \times \frac{10}{9}$ | 33.6 | 15.2 | 23.0 |

(2) Subcutaneous administration

The studied product was administered subcutaneously at daily doses of $$10\gamma \times \frac{10}{9}, 50\gamma \times \frac{10}{9} \text{ and } 250\gamma \times \frac{10}{9}$$

in a solution of olive oil admixed with 5% of benzyl alcohol under similar conditions.

In Table IV the results obtained are summarized.

step was dissolved in 30 cc. of tetrahydrofuran while agitating under an atmosphere of nitrogen. 15 cc. of a 50% aqueous solution of acetic acid were added thereto at room temperature, and agitation was continued for 2 hours. The reaction mixture was poured into an aqueous sodium bicarbonate solution, and extracted with ethyl ether. The extracts were washed with water, dried and evaporated to dryness. The residue was dissolved in 4 cc. of pentane and ice-cooled. The precipitate was separated

TABLE IV

| Lots | Daily dose | Fresh levator ani, mg. | Seminal vesicles, mg. | Prostate gland, mg. |
| --- | --- | --- | --- | --- |
| Controls | 0 | 22.2 | 2.6 | 6.5 |
| 13β-ethyl-17β-benzyloxy-$\Delta^{4,9,11}$-gonatriene-3-one | $10\gamma \times \frac{10}{9}$ | 24.7 | 7.5 | 20.4 |
|  | $50\gamma \times \frac{10}{9}$ | 44.2 | 23.5 | 45.3 |
|  | $250\gamma \times \frac{10}{9}$ | 59.8 | 81.2 | 93.5 | by filtration and washed with ice-cold pentane. There were obtained 507 mgm. of product, melting at 65–70° C. The mother liquors were chromatographed over alumina and eluted with ethyl ether. The eluted product was recrystallized from pentane, thus yielding a second crop of 175 mgm. of a product identical with that obtained above.

For purpose of purification, the combined crops of product were dissolved in ethyl ether, treated with carbon black, chromatographed over alumina, eluted with ethyl ether and the collected ethereal solutions were evaporated to dryness. The residue was dissolved at reflux temperature in a minimum volume of pentane. The solution was ice-cooled for 15 minutes. The precipitate was separated by filtration, washed with ice-cold pentane and dried, thus yielding $17\beta$ - cyclohexylmethoxy-$\Delta^{4,9,11}$-estratriene-3-one, melting at 66–68° C., and having a specific rotation $[\alpha]_D^{20} = +37° \pm 2°$ (c.=0.46%, in ethanol containing 1% triethylamine).

Analysis.—$C_{25}H_{34}O_2$ (percent); molecular weight =366.52. Calculated (percent): C, 81.92; H, 9.35. Found (percent): C, 82.1; H, 9.6.

Ultraviolet spectrum:

Max. at 238 m$\mu$ $E_{1\,cm.}^{1\%} = 159$

Inflection toward 270 m$\mu$ $E_{1\,cm.}^{1\%} = 93$

Max. at 314 m$\mu$ $E_{1\,cm.}^{1\%} = 783$ or $\epsilon = 28,700$

As far as is known, this compound is not described in the literature.

(C) Pharmacological Study.—Determination of anabolic and androgenic activities.

The tests were conducted as in Example I(D) above. $17\beta$ - cyclohexylmethoxy - $\Delta^{4,9,11}$ - estratriene - 3 - one was administered orally at daily doses of $$10\gamma \times \frac{10}{9} \text{ and } 100\gamma \times \frac{10}{9}$$

(total doses of 0.1 and 1 mgm. given in 9 administrations over a period of 10 days).

The results are summarized in Table V.

Analysis.—$C_{25}H_{27}O_2Cl$ (percent): molecular weight =394.95. Calculated: C, 76.02; H, 6.89; Cl, 8.97. Found (percent): C, 76.0; H, 7.0; Cl, 9.0.

Ultraviolet spectra (ethanol):

Max. at 221–222 m$\mu$ $E_{1\,cm.}^{1\%} = 376$

Inflection towards 224 m$\mu$ $E_{1\,cm.}^{1\%} = 350$

Inflection towards 236 m$\mu$ $E_{1\,cm.}^{1\%} = 177$

Max. at 269 m$\mu$ $E_{1\,cm.}^{1\%} = 99$

Max. at 340 m$\mu$ $E_{1\,cm.}^{1\%} = 759$ or $\epsilon = 30,000$

This compound is not described in the literature.

$17\beta$ - p - methoxybenzyloxy - $\Delta^{4,9,11}$ - estratriene-3-one in the form of pale yellow crystals having a melting point of 97° C. and a specific rotation $[\alpha]_D^{20} = +44° \pm 2°$ (c.=0.5% in ethanol containing 1% of triethylamine). The product is soluble in acetone, ethanol and methylene chloride and insoluble in water.

Analysis.—$C_{26}H_{30}O_3$ (percent): molecular weight =390.50. Calculated: C, 79.96; H, 7.74. Found (percent): C, 80.3; H, 8.0.

Infrared spectra:
Presence of the trienone.
Presence of an aromatic ring substituted by a heteroatom at 1613 and 1507 cm.$^{-1}$.

Ultraviolet spectra:

Max. at 226–227 m$\mu$ $E_{1\,cm.}^{1\%} = 405$

Inflection towards 240 m$\mu$ $E_{1\,cm.}^{1\%} = 172$

Inflection towards 275 m$\mu$ $E_{1\,cm.}^{1\%} = 132$

Max. at 281 m$\mu$ $E_{1\,cm.}^{1\%} = 140$

Max. at 340–341 m$\mu$ $E_{1\,cm.}^{1\%} = 785$ or $\epsilon = 30,650$

This compound is not described in the literature.

$17\beta$ - (cyclohex - 1' - enyl) - methoxy-$\Delta^{4,9,11}$ - estratriene-3-one. This compound is not described in the literature.

EXAMPLE 7.—PHARMACOLOGICAL TESTS (A) Determination of the retarded anabolisant and androgenic actions Sakamoto test: The determination of the retarded effect was made according to the technique of Sakamoto et al. (Proc. Soc. Exp. Biol. Med. 76, 406 [1951]). Male rats,

TABLE V

| Lots | Daily dose | Fresh levator ani, mg. | Seminal vesicles, mg. | Prostate gland, mg. |
|---|---|---|---|---|
| Controls | 0 | 15.4 | 4.8 | 10.4 |
| $17\beta$-cyclohexylmethoxy-$\Delta^{4,9,11}$-estratriene-3-one | $10\gamma \times \frac{10}{9}$ | 25.6 | 7.1 | 13.6 |
|  | $100\gamma \times \frac{10}{9}$ | 5.4 | 28.r | 35.9 |

These results show the studied compound possesses a marked anabolic and androgenic activity when administered orally.

In an analogous manner, the following $17\beta$ - cyclic ethers of $\Delta^{4,9,11}$-gonatrienes of the general Formula I were obtained:

$17\beta$ - p - chlorobenzyloxy - $\Delta^{4,9,11}$ - estratriene - 3 - one in the form of a colorless solid having a melting point of 113° C. and a specific rotation $[\alpha]_D^{20} = +54.5° \pm 1.5°$ (ethanol). The product is soluble in ether, benzene and methylene chloride, slightly soluble in alcohols and insoluble in water.

castrated at the age of four and a half weeks, received a single subcutaneous injection of the product at the age of seven and a half weeks. Thereafter, they were sacrificed various days after the injection as is indicated in Table VI.

The animals were subjected to autopsy after their sacrifice and the organs of interest were separated and weighed, in particular, the seminal vesicles and prostate gland for the determination of the androgenic effect and the levator ani for the study of the myotrophic action.

$17\beta$ - benzyloxy - $\Delta^{4,9,11}$ - estratriene - 3 - one was administered at doses of 2 mg. and 10 mg. per animal.

17β - cyclohexylmethoxy - $\Delta^{4,9,11}$ - estratriene - 3 - one was administered at a dose of 10 mg. per animal.

7α - methyl - 17β - benzyloxy - $\Delta^{4,9,11}$ - estratriene-3-one was administered at a dose of 10 mg. per animal.

Expression of the results

With the adsorption spectra, the presence of the product is shown when the difference between the control versus the treated absorptions presents a maximum in the neighborhood of that of the product administered. The evaluation figures, with reference to those of the zone of injection, are based on a correction by readings of the two (420 and 340 mµ).

With the chromatograph, subsequently the examination of the plates at 366 mµ (fluorescent 3-keto trienic structure) allows the qualitative verification of the preceding results and authenticates the presence of the products. The sensitivity is superior to that obtained with a spectrophotometer.

TABLE VI

| Day of sacrifice | Treatment | Dosage, mg. | Fresh levator ani, mg. | Seminal vesicles, mg. | Prostate, mg. |
|---|---|---|---|---|---|
| 22 | Control | 0 | 34.3 | 6.5 | 10.6 |
|  | 17β-benzyloxy-$\Delta^{4,9,11}$-estratriene-3-one | 2 | 70.9 | 36.6 | 36.0 |
|  |  | 10 | 111.8 | 245.9 | 153.4 |
| 36 | Control | 0 | 55.3 | 7.8 | 27.4 |
|  | 17β-benzyloxy-$\Delta^{4,9,11}$-estratriene-3-one | 2 | 50.1 | 25.7 | 29.5 |
|  |  | 10 | 83.2 | 41.3 | 24.7 |
| 10 | Control | 0 | 42.8 | 7.2 | 11.9 |
|  | 17β-cyclohexylmethoxy-$\Delta^{4,9,11}$-estratriene-3-one | 10 | 100.7 | 57.0 | 38.7 |
| 24 | Control | 0 | 41.4 | 9.3 | 10.4 |
|  | 17β-cyclohexylmethoxy-$\Delta^{4,9,11}$-estratriene-3-one | 10 | 168.2 | 69.0 | 25.6 |
| 38 | Control | 0 | 51.9 | 5.1 | 9.6 |
|  | 17β-cyclohexylmethoxy-$\Delta^{4,9,11}$-estratriene-3-one | 10 | 184.8 | 94.1 | 33.5 |
| 10 | Control | 0 | 43.3 | 8.0 | 11.2 |
|  | 17β-cyclohexylmethoxy-$\Delta^{4,9,11}$-estratriene-3-one | 2 | 84.8 | 23.2 | 21.6 |
| 24 | Control | 0 | 40.4 | 7.1 | 11.1 |
|  | 17β-cyclohexylmethoxy-$\Delta^{4,9,11}$-estratriene-3-one | 2 | 105.6 | 27.2 | 19.1 |
| 38 | Control | 0 | 49.5 | 7.1 | 12.8 |
|  | 17β-cyclohexylmethoxy-$\Delta^{4,9,11}$-estratriene-3-one | 2 | 92.1 | 19.1 | 17.0 |
| 7 | Control | 0 | 52.7 | 9.6 | 8.1 |
|  | 7α-methyl-17β-benzyloxy-$\Delta^{4,9,11}$-estratriene-3-one | 10 | 92.7 | 91.2 | 96.5 |
| 21 | Control | 0 | 46.3 | 6.9 | 6.4 |
|  | 7α-methyl 17β benzyloxy-$\Delta^{4,9,11}$-estratriene-3-one | 10 | 115.2 | 250.0 | 187.8 |
| 35 | Control | 0 | 73.9 | 7.5 | 6.5 |
|  | 7α-methyl-17β-benzyloxy-$\Delta^{4,9,11}$-estratriene-3-one | 10 | 160.1 | 206.0 | 443.0 |

These results demonstrate the persistency of the androgenic and anabolic effect of the compounds studied over long periods of time after a single injection at the dosages indicated.

(B) Study of the storage of androgenic steroids in the rat (1) In the zone of injection at various times after administration in oily solution.

(2) Products studied:

(a) 17α-methyl-$\Delta^{4,9,11}$-estratriene-17β-ol-3-one (1881), utilized as control,
(b) 17β-benzyloxy-$\Delta^{4,9,11}$-estratriene-3-one (2951)
(c) 17β-cyclohexylmethoxy-$\Delta^{4,9,11}$-estratriene-3-one (3785)
(d) 7α-methyl-17β-benzyloxy-$\Delta^{4,9,11}$-estratriene-3-one (4442)
(e) 17β-(p-methylsulfonyl)-benzyloxy-$\Delta^{4,9,11}$-estratriene-3-one (4157)
(f) 17β-(2′,4′,6′-trimethyl)-benzyloxy-$\Delta^{4,9,11}$-estratriene-3-one (3882).

Technique

The zone surrounding the point of injection is separated and ground in chloroform. After centrifuging:

(1) An aliquot is evaporated; the residue is taken up in methanol and the adsorption spectra is traced from 300 to 420 mµ. (The 3-keto trienic structures have a maximum toward 340 mµ.)

(2) Another aliquot is subjected to chromatography in the presence of a reference product on plates of Kieselgel HF 254.

The control samples are treated in a parallel manner.

Remarks

With reference to the zones of injection, it is quite evident that the precision of the sampling is a function of time elapsed since the treatment. During the first days, the oily solvent is quite localized and the sampling is easily definable. In contrast, after more prolonged times, a large diffusion is produced and the limits of the sampling become imprecise; the evaluations are, therefore, partially a function of the surface sampled.

The results shown in the table are of products found in the region injected subcutaneously in solution in olive oil containing 5% of benzyl alcohol. The products studied were administered in the dosages indicated.

The animals utilized are castrated male rats as utilized in (A) above in the Sakamoto test.

Table VII below gives the results obtained. The underlined value in the column "Evaluation as percent of the dose injected" is the average for the values obtained from the individual rats.

TABLE VII
Storage at the Point of Injection

|  | Dose administered, mg. | Day of sacrifice | Number of animals | Spectra Presence of a max. | Evaluation as percent of the dose injected | Chromatography |
|---|---|---|---|---|---|---|
| Products studied: |  |  |  |  |  |  |
| 1,881 | 10 | 5 | 5 | 0 | 0 | Traces 3 out of 5. |
|  | 10 | 12 | 5 | 0 | 0 | Traces 1 out of 5. |
| 2,951 | 10 | 7 | Pool | + | 13.0 | + |
|  | 10 | 21 | 5 | + | 0.1; 28.4; 0.5; 9.5; 13.8 | + |

TABLE VII—Continued

| Dose administered, mg. | Day of sacrifice | Number of animals | Presence of a max. | Evaluation as percent of the dose injected | Chromatography |
|---|---|---|---|---|---|
| Average | | | | 10.5 | |
| | 10 | 35 | 5 + | 0.6; 0.8; 0.2; 0.2; 2.3 | + |
| Do | | | | 0.8 | |
| | 10 | 38 | Pool + | 1.0 | + |
| 3,785 | 2 | 38 | Polo + | 7.0 | + |
| 4,442 | 10 | 7 | Pool + | 19.3 | + |
| | 10 | 21 | 3 + | 0.4; 10.4; 20.7 | + |
| Average | | | | 10.5 | |
| | 10 | 35 | 5 + | 0.9; 6.4; 23.5; 1.7; 7.8 | + |
| Do | | | | 8.1 | |
| 4,157 | 10 | 8 | 5 + | 29.9; 2.6; 3.8; 16.8; 35.5 | + |
| | | | | 17.7 | |
| 3,882 | 10 | 8 | 5 + | 1.2; 0.4; 1.4; 38.5; 28.0 | + |
| | | | | 13.9 | |

These results demonstrate that the alcohol, 17α-methyl-Δ$^{4,9,11}$-estratriene-17β-ol-3-one (1881) does not persist at the zone of injection and has almost completely disappeared five days after the injection. In contrast, the 17β-cyclic ethers of the invention are present at the zone of injection in relatively large amounts of from 13% to 19.3% of the dosage injected after one week and for periods of over thirty days, measurable amounts of the injected steroid may be found. As shown in Table VII, these 17β-cyclic ethers of the invention are effective as androgenic and anabolisant agents over this entire period of over thirty days. Of the compounds tested, 17β-cyclohexylmethoxy-Δ$^{4,9,11}$-estradiene-3-one (3785) and 7α-methyl-17β-benzyloxy-Δ$^{4,9,11}$-estratriene-3-one (4442) were equivalent and showed the longest persistency of effectiveness.

As it has been already indicated, the 17β-cyclic ether compounds of the general Formula I are endowed with interesting pharmacological properties. In particular, they possess an important anabolisant and androgenic action of a persistent nature. They can be utilized for the treatment of disturbances of proteidic anabolism, of asthenia, of thinness, osteoporosis, andropause, senescence, retarded consolidation of fractures, metabolic disturbances due to prolonged cortico therapy, adiposogenital syndrome, functional meno-metrorrhagia, fibroma, endometriosis. Furthermore, the compounds can be utilized for supplemental treatment as a cicatrization agent in the treatment of varicose ulcers.

The 17β-cyclic ethers of the Δ$^{4,9,11}$-gonatrienes, corresponding with the general Formula I, are utilized preferably by administration in an oily solution, transcutaneously. They can be prepared in the form of injectable solutions or suspensions, in the form of solutions for transcutaneous usage.

The useful dosology is controlled between 15 mg./kg. and 100 mg./kg. in the warm-blooded animal according to the product utilized and as a function of the frequency of administration and therapeutic indication.

The pharmaceutical forms such as injectable solutions or suspensions and solutions for the transcutaneous usage, are prepared according to the usual processes or as indicated in the preceding examples.

The preceding specific embodiments are illustrative of the invention. It is to be understood, however, that other expedients known to those skilled in the art may be employed without departing from the spirit of the invention.

We claim:
1. Δ$^{4,9,11}$-gonatrienes of the formula

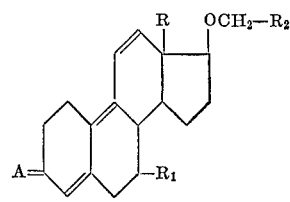

wherein
A represents a member selected from the group consisting of oxygen, di-lower-alkoxy and lower alkylene dioxy;
R represents an alkyl having from 1 to 4 carbon atoms;
$R_1$ represents a member selected from the group consisting of hydrogen and lower alkyl; and
$R_2$ represents a member selected from the group consisting of phenyl, lower alkylsulfonylphenyl, lower alkylphenyl, halophenyl, lower alkoxyphenyl, cyclohexyl, cyclohexenyl and cyclohexadienyl.

2. The compound of claim 1 wherein A is oxygen, R is methyl, $R_1$ is hydrogen and $R_2$ is phenyl.

3. The compound of claim 1 wherein A is oxygen, R is ethyl, $R_1$ is hydrogen and $R_2$ is phenyl.

4. The compound of claim 1 wherein A is oxygen, R is methyl, $R_1$ is methyl and $R_2$ is phenyl.

5. The compound of claim 1 wherein A is oxygen, R is methyl, $R_1$ is hydrogen and $R_2$ is p-methylsulfonylphenyl.

6. The compound of claim 1 wherein A is oxygen, R is methyl, $R_1$ is hydrogen and $R_2$ is 2,4,6-trimethylphenyl.

7. The compound of claim 1 wherein A is oxygen, R is methyl, $R_1$ is hydrogen and $R_2$ is cyclohexyl.

8. The compound of claim 1 wherein A is ethylenedioxy, R is methyl, $R_1$ is hydrogen and $R_2$ is phenyl.

9. The compound of claim 1 wherein A is ethylenedioxy, R is methyl, $R_1$ is hydrogen and $R_2$ is p-methylsulfonylphenyl.

10. The compound of claim 1 wherein A is ethylenedioxy, R is methyl, $R_1$ is hydrogen and $R_2$ is 2,4,6-trimethylphenyl.

11. The compound of claim 1 wherein A is ethylenedioxy, R is ethyl, $R_1$ is hydrogen and $R_2$ is phenyl.

12. The compound of claim 1 wherein A is ethylenedioxy, R is methyl, $R_1$ is hydrogen and $R_2$ is cyclohexyl.

13. The compound of claim 1 wherein A is oxygen, R is methyl, $R_1$ is hydrogen and $R_2$ is p-chlorophenyl.

14. The compound of claim 1 wherein A is oxygen, R is methyl, $R_1$ is hydrogen and $R_2$ is p-methoxyphenyl.

15. The compound of claim 1 wherein A is oxygen, R is methyl, $R_1$ is hydrogen and $R_2$ is cyclohex-1-enyl.

16. 17β-cyclic ethers of $\Delta^{4,9,11}$-gonatrienes of the formula

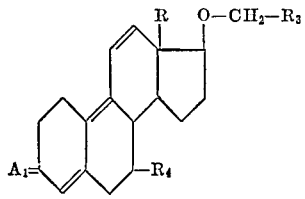

wherein $A_1$ represents a member selected from the group consisting of oxygen and lower alkylene dioxy;

R represents alkyl having from 1 to 4 carbon atoms;

$R_3$ represents a member selected from the group consisting of phenyl, lower alkylsulfonylphenyl, lower alkylphenyl, halophenyl, lower alkoxyphenyl, cyclohexyl and cyclo hexenyl; and $R_4$ represents a member selected from the group consisting of hydrogen and methyl.

References Cited

UNITED STATES PATENTS

| | | |
|---|---|---|
| 3,052,672 | 9/1962 | Nomine et al. |
| 3,086,027 | 4/1963 | Perelman et al. |
| 3,453,267 | 7/1969 | Vignau et al. |

HENRY A. FRENCH, Primary Examiner

U.S. Cl. X.R.

260—397.5, 397.45; 424—241, 243